US006915000B1

(12) United States Patent
Tanaka

(10) Patent No.: US 6,915,000 B1
(45) Date of Patent: Jul. 5, 2005

(54) SYSTEM AND APPARATUS FOR INSERTING ELECTRONIC WATERMARK DATA

(75) Inventor: Nobuyuki Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 495 days.

(21) Appl. No.: 09/678,451

(22) Filed: Oct. 3, 2000

(30) Foreign Application Priority Data

Oct. 5, 1999 (JP) .......................................... 11-284854

(51) Int. Cl.[7] .............................................. G06K 9/00
(52) U.S. Cl. ................................................... 382/100
(58) Field of Search ................................ 382/100, 232, 382/248, 250, 280, 291; 380/51, 55, 201, 217; 713/176; 348/460, 461; 386/94; 725/20.22; 399/566; 705/57, 58; 358/3.28

(56) References Cited

U.S. PATENT DOCUMENTS

| 5,778,102 | A | * | 7/1998 | Sandford et al. ........... 382/251 |
| 6,175,639 | B1 | * | 1/2001 | Satoh et al. ................ 382/100 |
| 6,208,745 | B1 | * | 3/2001 | Florencio et al. ........... 382/100 |
| 6,222,932 | B1 | * | 4/2001 | Rao et al. ................... 382/100 |
| 6,285,775 | B1 | * | 9/2001 | Wu et al. .................... 382/100 |
| 6,310,962 | B1 | * | 10/2001 | Chung et al. ............... 382/100 |

(Continued)

FOREIGN PATENT DOCUMENTS

| EP | 0 860 997 A2 | 8/1998 |
| JP | 5-30466 | 2/1993 |
| JP | 6-315131 | 11/1994 |
| JP | 8-241403 | 9/1996 |
| JP | 11-55639 | 2/1999 |
| JP | 11-164235 | 6/1999 |

OTHER PUBLICATIONS

Kim, S.–W. et al., "Perceptually Tuned Robust Watermarking Scheme for Digital Video using Motion Entropy Masking," IEEE Proc. Int. Conf. on Consumer Electronics, Jun. 1999, pp. 104–105.*

Wolfgang, et al., "Perceptual Watermarks for Digital Images and Video", *Proceedings of the IEEE*, 87(7): 1108–1126 (1999).

Hsu, et al., "DCT–Based Watermarking for Video", *IEEE Transactions on Consumer Electronics*, 44(1): 206–216 (1998).

(Continued)

*Primary Examiner*—Andrew W. Johns
*Assistant Examiner*—Shervin Nakhjavan
(74) *Attorney, Agent, or Firm*—Scully, Scott, Murphy & Presser

(57) ABSTRACT

The DCT converter 103 extracts block data 102 of a 8×8 pixel size from the original image 101 and then subjects it to DCT conversion. The quantizer 104 quantizes the DCT coefficient. The movement decision unit 106 obtains the difference between the number V(t) of DCT coefficients obtained by the DCT converter 103 and the number V(t−1) of DCT coefficients of the previous frame previously held. The movement decision unit 106 decides the movement as a large value if the difference exceeds a certain threshold value and decides the movement as a small value if the difference is less than the threshold value. The electronic watermark data inserter 105 extracts electronic watermark data W(j) which matches the location where 8×8 block data is extracted from the electronic watermark data table 109, the picture type and the movement and then inserts it into the data after quantization output from the quantizer 104.

7 Claims, 10 Drawing Sheets

U.S. PATENT DOCUMENTS

| | | | | |
|---|---|---|---|---|
| 6,341,350 B1 | * | 1/2002 | Miyahara et al. | 713/176 |
| 6,359,999 B1 | * | 3/2002 | Moriwaki et al. | 382/100 |
| 6,373,960 B1 | * | 4/2002 | Conover et al. | 382/100 |
| 6,404,926 B1 | * | 6/2002 | Miyahara et al. | 382/232 |
| 6,449,378 B1 | * | 9/2002 | Yoshida et al. | 382/100 |
| 6,512,837 B1 | * | 1/2003 | Ahmed | 382/100 |
| 6,587,821 B1 | * | 7/2003 | Rhoads | 704/270 |
| 6,639,996 B2 | * | 10/2003 | Suda | 382/100 |
| 2002/0087864 A1 | * | 7/2002 | Depovere et al. | 713/176 |

OTHER PUBLICATIONS

Swanson, et al., "Multiresolution Scene–Based Video Watermarking Using Perceptual Models", *IEEE Journal on Selected Areas in Communications*, 16(4): 540–550 (1998).

Hartung, et al., "Watermarking of uncompressed and compressed video", *Signal Processing*, 66: 283–301 (1998).

Suthaharan, et al., "Perceptually Tuned Video Watermarking Scheme using Motion Entropy Masking", *IEEE Tencon*, 182–185 (1999).

Koc, et al., "Discrete–Cosine/Sine–Transform Based Motion Estimation", *IEEE*, 771–775 (1994).

* cited by examiner

FIG. 7

| | | | | | | | |
|---|---|---|---|---|---|---|---|
| 1 | 2 | 6 | 7 | 15 | 16 | 28 | 29 |
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

HORIZONTAL SPACE FREQUENCY fH →

VERTICAL SPACE FREQUENCY fV ↓

SYSTEM AND APPARATUS FOR INSERTING ELECTRONIC WATERMARK DATA

BACKGROUND OF THE INVENTION

The present invention relates to a digital image processing technique. More particularly, the present invention relates to a technique of inserting identification data (electronic watermark data) having special information into digital images.

Recently, illegal copies of digital images have raised troublesome questions. In order to prevent such illegal replication, the system has been considered that encrypts digital image data and allows only the reproduction system with a valid secret decryption key to reproduce encrypted digital image data.

However, after the encryption is once decoded, this system cannot prevent subsequent replication. In order to prevent digital images from being illegally used or replicated, the method has been considered of directly burying special information (hereinafter referred to as "electronic watermark data") in digital images.

Two types of data including visible electronic watermark data and invisible electronic watermark data are considered as electronic watermark data for digital images. The visible electronic watermark data, which contains special characters or symbols combined with an image, can be visually sensed. This electronic watermark data may degrade the image quality but has the advantage of visually warning users to prevent misappropriation of digital images.

An example of burying such visible electronic watermark data is disclosed in JP-A-241403/1996. In this method, only the luminance of pixels corresponding to opaque portions of electronic watermark data is varied so that visible electronic watermark data is synthesized with the original image without changing the color components. The scaling value of varying the pixel luminance component depends on color components, random numbers, pixel values of electronic watermark data, or others.

The invisible electronic watermark data is buried in an image, in consideration of degradation of image quality. Since the image quality degradation is not substantially negligible, the invisible watermark data cannot be visually recognized. However, if special information, which can be recognized by an author, is buried as the electronic watermark data, the author can specify by detecting the electronic watermark data even after illegal replication.

Moreover, information about replication disapproval may be buried in an image. In such a case, when the reproduction unit, for example, detects the replication disapproval information, the reproduction by a VTR or the equivalent can be restricted by informing the user that the detected information is reproduction prohibited data, or by operating the replication preventing mechanism within the reproduction unit.

Prior various methods have been proposed to bury invisible electronic watermark data into digital images.

For example, one approach is to bury special information as electronic watermark data in portions not adversely affecting the image quality, such as LSBs of pixel data. However, this method may remove the electronic watermark data from images. For example, information regarding LSBs of pixels will be missed using a low-pass filter. The image compression process discards the volume of information not adversely affecting the image quality, thus reducing the volume of data. This means that the electronic watermark data is lost. As a result, the problem is that it is difficult to re-detect the electronic watermark data.

JP-A-No. 315131/1994 discloses as another example the method of burying specific information by using the correlation between continuous frame images and detecting the area where degradation in image quality does not occur even when substitution is performed in peripheral areas upon reproduction. FIG. 9 shows the method of inserting and detecting electronic watermark data, disclosed in the above publication. According to this method, an identification data buried area is specified signal dropout portion and conversion information upon reproduction and then the corresponding portion is corrected to reconstitute an Image.

As further another example, JP-A-No. 30466/1993 discloses the method of converting the frequency of a video signal and then burying information with signals of frequencies lower than the frequency band of the converted video signal. FIG. 10 shows the electronic watermark detecting system, disclosed in the above publication. In this method, a broad band-pass filter extracts the original video signal while a low-pass filter extracts the buried identification data.

In another example, the method of frequency-converting images and then burying electronic watermark data into portions with strong frequency components of a video signal after the frequency conversion (see "NIKKEI Electronics", 1996, 4.22 (no. 660), page 13).

In this method, since electronic watermark data is buried into areas with strong frequency components, the electronic watermark data is not lost through the image processing such as compression process or filtering. Moreover, using the random numbers with a normal distribution as electronic watermark data makes it difficult to prevent interference between electronic watermark data and to destroy the electronic watermark data without significantly affecting the entire image.

In the electronic watermark data burying method, the original image is first transformed into frequency components by, for example, the DCT (discrete cosine transform). n sets of data with high values over high frequency range are selected as f(1), f(2), . . . , f(n). The electronic watermark data sets, w(1), w(2), . . . w(n), are selected from a normal distribution having an average of 0 and a dispersion of 1. The formula, $F(i)=f(i) +\alpha \times |f(i)| \times w(i)$, where $\alpha$ is a scaling factor, is calculated to obtain respective (i)s. The frequency component in which f(i) is substituted for F(i) undergoes IDCT (inverse discrete cosine transform) so that the image in which the electronic watermark data is buried is obtained.

Moreover, the electronic watermark data is detected according to the following method. In this detection method, both the original image and electronic watermark data candidate w(i) (where i=1, 2, . . . , n) must be known.

First, the image containing electronic watermark data is converted into frequency components through, for example, DCT. Values corresponding to factor values, f(1), f(2), f(n), each containing an electronic watermark, are set as f(1), F(2), . . . , F(n), respectively. The formula, $W(i)=(F(i)-f(i))/f(i)$, is solved using f(i) and F(i) to extract the electronic watermark data W(i).

Next, the statistical similarity C between w(i) and W(i) is obtained by the following formula including a vector inner product.

$$C = W \times w / (WD \times wD)$$

where W=(W(1), W(2), . . . , W(n)); w=(w(1), w(2), . . . , w(n); WD=the absolute value of a vector W; and wD=the absolute value of a vector w. When the statistical similarity C is more than a specific value, it is decided that the electronic watermark data is in a buried state.

Accordingly, by burying the electronic watermark data into an image through the above-mentioned method, an author holding an original image effectively detects digital image data suspected as an illegal replicate. Since the above-mentioned method requires the original image, the author, that is, an original image owner, can detect image data doubted as an illegal replicate. However, the reproduction unit at each terminal cannot detect electronic watermark data because of the absence of the original image.

To overcome that problem, an improvement of the above-mentioned method for the terminal processing, particularly, the MPEG system, has been proposed. In this improved method, the original image is divided into blocks each having 8 pixels×8 pixels. Electronic watermark data is buried or extracted in block process units.

In the electronic watermark data burying process, AC frequency components are set as $f(1), f(2), \ldots, f(n)$ in a frequency increasing order over a frequency range after the discrete cosine transformation in the MPEG encoding process. The electronic watermark data, $w(1), w(2), \ldots, w(n)$ are selected from the normal distribution having an average of 0 and a dispersion of 1. In order to obtain respective (i)s, the formula of $F(i)=f(i)+\alpha \times avg (f(i)) \times w(i)$ is calculated, where α is a scaling factor and avg(f(i)) is a partial average obtained by averaging the absolute values at three points adjacent to f(i). The successive steps in the MPEG encoding process is performed by substituting f(i) with F(i).

Electronic watermark data is detected according to the following method. This method does not require any original image. It is merely required that electronic watermark data candidate w(i) (where $i=1, 2, \ldots, n$) is known.

Over the block frequency region after inverse quantization of the MPEG expanding process, the frequency components are set as $F(1), F(2), \ldots, F(n)$ in a frequency increasing order. The average of the absolute values of three points adjacent to F(i) is set as a partial average avg(F(i)). The electronic watermark data W(i) is obtained by calculating the following formula.

$$W(i)=F(i)/avg(F(i))$$

Moreover, t he sum WF(i) of w(i) for one frame is calculated for each (i).

Next the statistical similarity C between w(i) and WF(i) is obtained by calculating the following formula including an vector inner product:

$$C=WF \times w/(WFD \times wD)$$

where $W=(WF(1), WF(2), \ldots, WF(n))$; $w=(w(1), w(2), \ldots, w(n))$; WFD=the absolute value of a vector WF; and wD=the absolute value of a vector w. When the statistical similarity C is more than a specific value, it is decided that the corresponding electronic watermark data is in a buried state.

However, the above-mentioned prior-art techniques have the following disadvantages. In the example disclosed in JP-A-No. 315131/1994, because the electronic watermark information is not buried into all frames, frames with no buried electronic watermarks cannot be prevented from illegal copying. Moreover, since it is assumed that successive frames are static images and not changed, the area where electronic watermark data is buried cannot be specified so that electronic watermark data cannot be buried in fast moving images.

In the example disclosed in JP-A-No. 30466/1993, since electronic watermark data is buried in the frequency area lower than that after frequency conversion of an image, the high-frequency pass filter can easily remove the electronic watermark data.

In the example of burying the electronic watermark into the portion with strong frequency component after frequency conversion, the above-mentioned problems do not occur. However, since the common electronic watermark data is buried in any scene, the electronic watermark is easily viewed on the screen with small motion like a static image if the electronic watermark is emphasized to improve the detection efficiency. As a result, the image quality is deteriorated. Further problem is that the detection efficiency is reduced if the electronic watermark is weakly inserted to prevent deterioration in image quality.

SUMMARY OF THE INVENTION

The present invention is made to solve the above-mentioned problems.

Moreover, the objective of the invention is to provide an electronic watermark data inserting system that can realize a high detection efficiency without deteriorating images.

The above-mentioned problem is solved by a system for inserting an electronic watermark data comprising: DCT converter for extracting a block of k×k pixels from an original image, subjecting said block to DCT (discrete cosine transform), and then outputting data after the DCT conversion; quantizer for quantizing DCT coefficients output from said DCT converter; movement decision means for deciding the magnitude of a movement based on a generation amount from said DCT converter; picture-type decision means for deciding a picture type; an electronic watermark data table for storing first to j-the electronic watermark data and electronic watermark data of (j×2) types having said movement, for each picture type; electronic watermark data selector for selecting said electronic watermark data of one type according to said picture type and said movement; and electronic watermark data inserter means for inserting said selected electronic watermark data into data after said DCT conversion; whereby the magnitude of a movement is decided by obtaining a difference between a DCT coefficient of a front frame and a DCT coefficient of a rear frame and electronic watermark data with a suitable strength is inserted according to the magnitude of said movement.

Moreover, the above-mentioned problem is solved by a system for inserting an electronic watermark data comprising: DCT converter for extracting a block of k×k pixels from an original image, subjecting said block to DCT (discrete cosine transform), and then outputting data after the DCT conversion; quantizer means for quantizing DCT coefficients output from said DCT converter means; movement decision means for deciding the magnitude of a movement based on a generation amount from said DCT converter means; picture-type decision means for deciding a picture type; original electronic watermark data memory for storing original electronic watermark data; j first multipliers each for subjecting said original electronic watermark to multiplication data according to said picture type; an electronic watermark data table for storing electronic watermark data of j types ranging from the first electronic watermark data to j-th electronic watermark data being outputs from said j multipliers; electronic watermark data selector for selecting electronic watermark data of one type among said electronic watermark data of j types; a second multiplier for subjecting said selected electronic watermark data to multiplication according to the magnitude of a movement obtained based on a difference between said DCT coefficients; and electronic watermark data insertion means for inserting electronic watermark data obtained through multiplication by said second multiplier into data after said DCT conversion; whereby the magnitude of a movement is decided by obtaining a difference between a DCT coefficient of a front frame and a DCT coefficient of a rear frame and electronic watermark data with a suitable strength is inserted according to the magnitude of said movement.

Moreover, the above-mentioned problem is solved by an apparatus for inserting an electronic watermark data comprising: a DCT converter for extracting a block of k×k pixels from an original image, subjecting said block to DCT (discrete cosine transform), and then outputting data after the DCT conversion; a quantizer for quantizing DCT coefficients output from said DCT converter; a movement decision unit for deciding the magnitude of a movement based on a generation amount from said DCT converter; a picture-type decision unit for deciding a picture type; an electronic watermark data table for storing first to j-th electronic watermark data and electronic watermark data of (j×2) types having said movement, for each picture type; an electronic watermark data selector for selecting said electronic watermark data of one type according to said picture type and said movement; and an electronic watermark data inserter for inserting said selected electronic watermark data into data after said DCT conversion; an inverse quantizer for inverse-quantizing a block of k×k pixels in which said electronic watermark data is inserted; and an IDCT covnerter for performing an IDCT (discrete cosine transform) of a block of k×k pixels in which said electronic watermark data inverse-quantized is inserted.

Moreover, the above-mentioned problem is solved by an apparatus for inserting an electronic watermark data comprising: a DCT converter for extracting a block of k×k pixels from an original image, subjecting said block to DCT (discrete cosine transform), and then outputting data after the DCT conversion; a quantizer for quantizing DCT coefficients output from said DCT converter; a movement decision unit for deciding the magnitude of a movement based on a generation amount from said DCT converter; a picture-type decision unit for deciding a picture type; an electronic watermark data table for storing first to j-th electronic watermark data and electronic watermark data of (j×2) types having said movement, for each picture type; an electronic watermark data selector for selecting said electronic watermark data of one type according to said picture type and said movement; and an electronic watermark data inserter for inserting said selected electronic watermark data into data after said DCT conversion; and a Huffman encoder for encoding data after insertion of said electronic watermark data.

Moreover, the above-mentioned problem is solved by an apparatus for inserting an electronic watermark data comprising: a DCT converter for extracting a block of k×k pixels from an original image, subjecting said block to DCT (discrete cosine transform), and then outputting data after the DCT conversion; a quantizer for quantizing DCT coefficients output from said DCT converter; a movement decision unit for deciding the magnitude of a movement based on a generation amount from said DCT converter; a picture-type decision unit for deciding a picture type; original electronic watermark data storage means for storing original electronic watermark data; j first multipliers each for subjecting said original electronic watermark to multiplication data according to said picture type; an electronic watermark data table for storing electronic watermark data of j types ranging from the first electronic watermark data to j-th electronic watermark data being outputs from said j multipliers; an electronic watermark data selector for selecting electronic watermark data of one type among said electronic watermark data of j types; a second multiplier for subjecting said selected electronic watermark data to multiplication according to the magnitude of a movement obtained based on a difference between said DCT coefficients; and an electronic watermark data inserter for inserting electronic watermark data obtained through multiplication by said second multiplier into data after said DCT conversion; an inverse quantizer for inverse-quantizing a block of k×k pixels in which said electronic watermark data is inserted; and an IDCT covnerter for performing an IDCT (discrete cosine transform).

Moreover, the above-mentioned problem is solved by an apparatus for decoding an electronic watermark data comprising: a decoder for extracting and decoding block data of a size of k×k pixels decoded by the electronic watermark data inserter; an IDCT converter for IDCT converting said block data decoded; an electronic watermark data extractor for obtaining the number of electronic watermark data to be extracted based on information on the location where said block data of a k×k pixel size is extracted and then extracting electronic watermark data from data after IDCT conversion output from said IDCT converter; extracted data storage means for storing data extracted by said electronic watermark data extractor; and an electronic watermark data detector for extracting electronic watermark data at a corresponding location by means of said extracted data storage means and said electronic watermark table after said extracted data storage means has stored extracted data for one screen and then calculating a statistical similarity, thus outputting a calculation result.

According to the present invention, the electronic watermark insertion device is characterized by inserting electronic watermark data with a suitable strength based on the difference between the generation amount of coefficient (hereinafter referred to as a DCT coefficient) generation amount after the DCT (discrete cosine transform) in the front picture and the generation amount of the coefficient (hereinafter referred to as a DCT coefficient) after the DCT (discrete cosine transform) in the rear picture. In other words, the difference between the DCT coefficient generation amount of the front picture and the DCT coefficient generation amount of the rear picture is first calculated. Then, electronic watermark data with a suitable strength is inserted in the difference. Thus, the electronic watermark inserting system with high detection efficiency can be realized without leading to deterioration in image quality.

Specifically, the electronic watermark data inserting system of the present invention includes a movement decision unit, a picture-type decision section, an electronic watermark data selector, an electronic watermark data table, and an electronic watermark data inserter.

The movement decision unit calculates the difference between the DCT coefficient generated amount V(t) DCT-converted at the time t and the DCT coefficient generated amount V(t+1) DCT-converted at the time (t+1) and then decides the magnitude of a movement between pictures based on the difference.

The picture-type decision section decides one of picture types including, for example, intra-encoded image (or Intra-Picture or hereinafter referred to as I-picture), predictive encoded image (Predictive-Picture or hereinafter referred to as P-picture), bidirectional predictive encoded image (Bidirectional-predictive-picture or hereinafter referred to as B-picture), and the like.

The electronic watermark data selector selects electronic watermark data according to a decision result obtained based on the picture type and the degree of movement on the electronic watermark data table and then outputs it to the electronic watermark data inserter. Thus, the electronic watermark data inserter inserts adaptive electronic watermark data.

The decision result obtained based on the degree of movement has the following meaning. That is, the electronic watermark data is strongly inserted because-a human's eye is not sensitive to pictures with large (violent) movement. In contrast, the electronic watermark data is weakly inserted because a human's eye is sensitive to pictures with small movement (like static images).

Particularly, since the DCT coefficient of the P or B picture becomes small on pictures with small movement, even inserting electronic watermark data strongly in both the frames is not considerably reflected onto the detection rate. Accordingly, it is desirable to weaken the strength of electronic watermark data to the P picture and the B picture on pictures with small movement.

BRIEF DESCRIPTION OF THE INVENTION

This and other objects, features, and advantages of the present invention will become more apparent upon a reading of the following detailed description and drawings, in which:

FIG. 7 is a diagram explaining DCT conversion;

DESCRIPTION OF THE EMBODIMENTS

Figure 1:
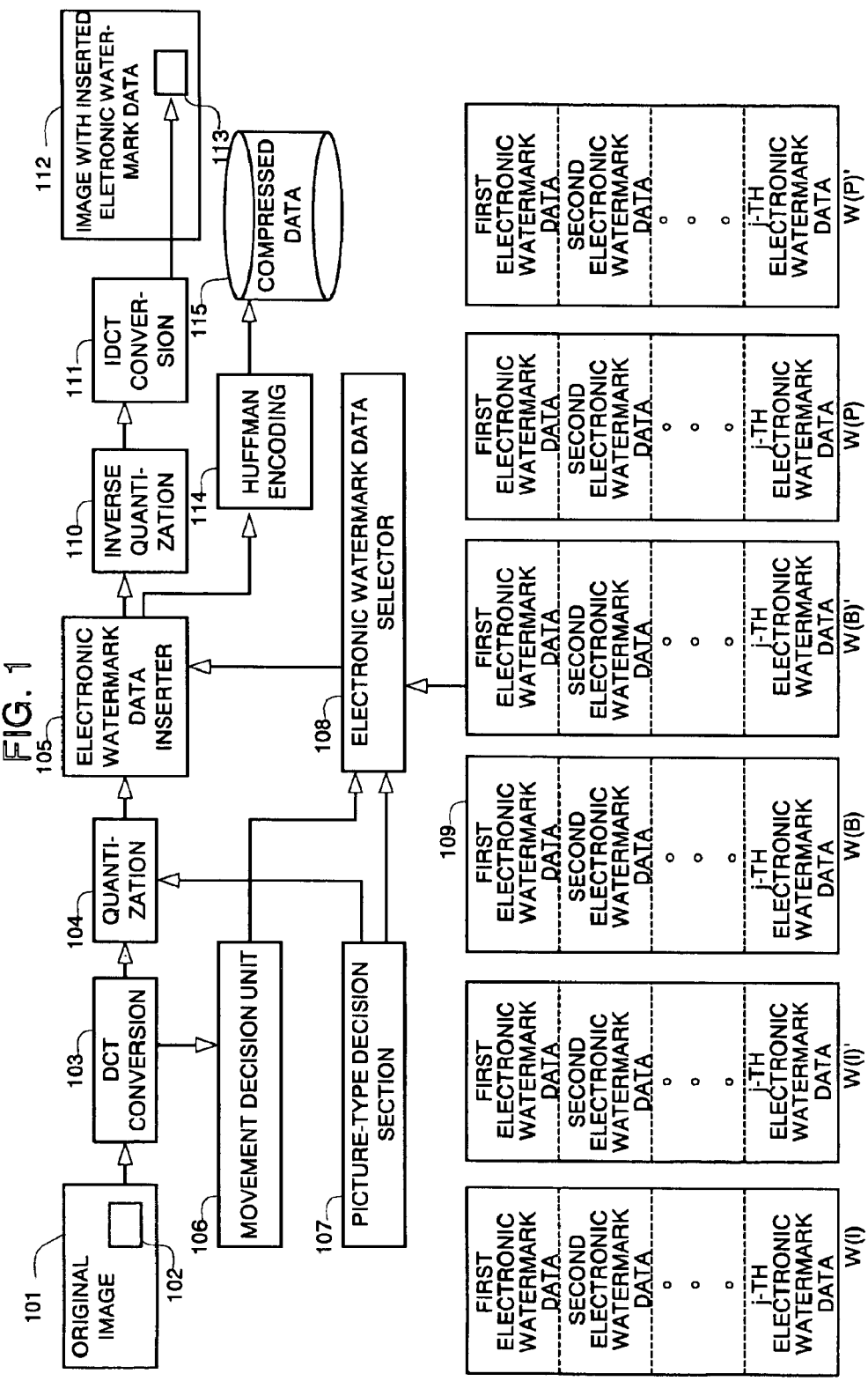
FIG. 1 is a system block diagram illustrating an electronic watermark data inserting system according to an embodiment of the present.

FIG. 1 is a system block diagram illustrating electronic watermark data inserting device according to an embodiment of the present invention.

According to the present invention, an electronic watermark data inserting device includes a DCT converter 103 for extracting a block 102 of k×k pixels from an original image 101, subjecting the block to DCT (discrete cosine transform), and then outputting data after the DCT conversion; a quantizer 104 for quantizing DCT coefficients; a movement decision unit 106 for deciding the magnitude of a movement based on a DCT coefficient generation amount; a picture-type decision unit 107 for deciding a picture type; an electronic watermark data table 109 for storing electronic watermark data of (j×2) types ranging from the first electronic watermark data to the j-th electronic watermark data, calculated to a suitable values based on each picture type and the magnitude of movement; an electronic watermark data selector 108 for selecting the electronic watermark data of one type according to the picture type and the magnitude of movement; an electronic watermark data inserter 105 for inserting the electronic watermark data into data after the DCT conversion; an inverse quantizer 110 for inverse-quantizing a block of k×k pixels in which the electronic watermark data is inserted; an IDCT converter 111 for performing an IDCT (discrete cosine transform); and a Huffman encoder 114 for performing an encoding process.

Figure 2:
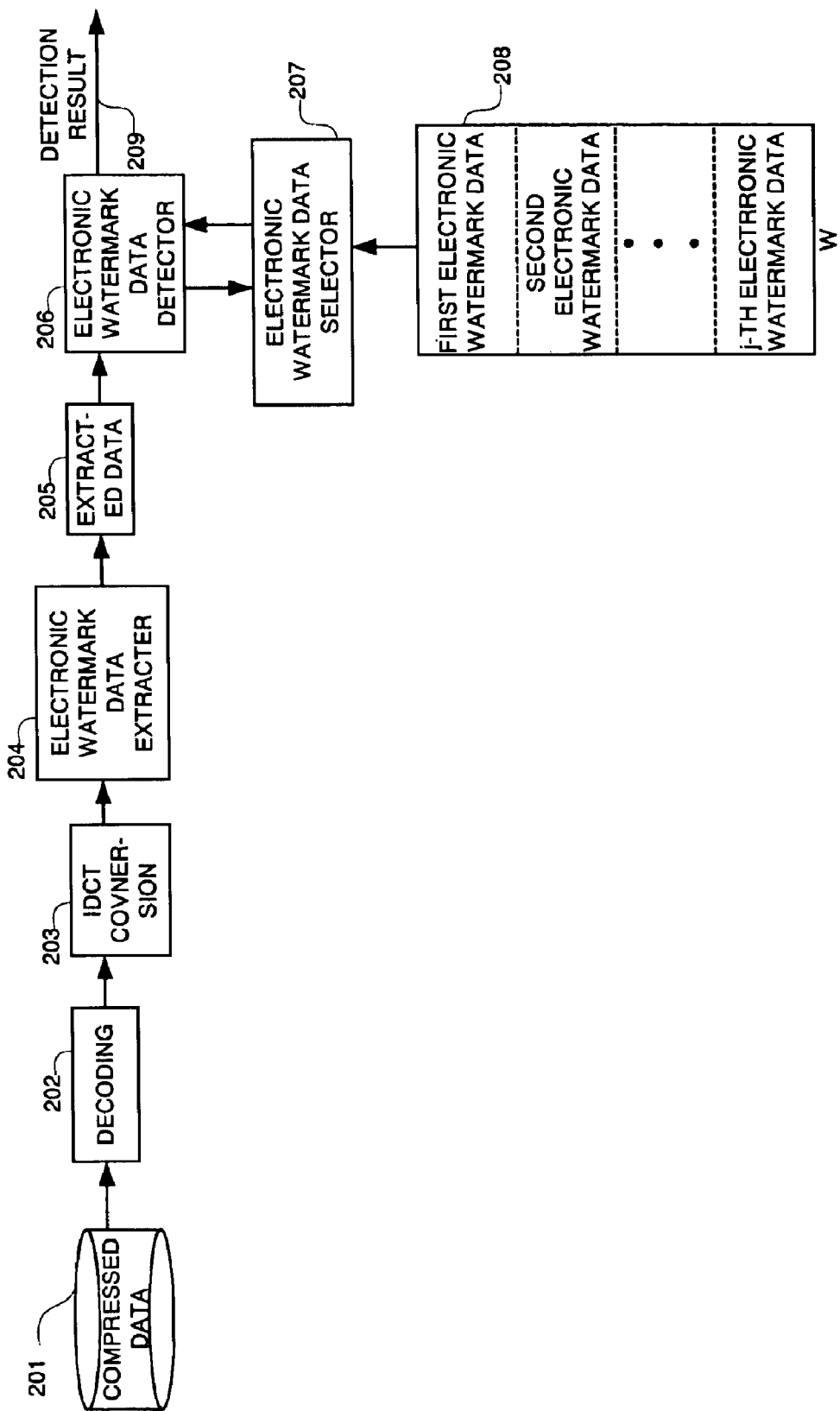
FIG. 2 is a system block diagram illustrating an electronic watermark data detecting system according to an embodiment of the present.

FIG. 2 is a system block diagram illustrating an electronic watermark data detector according to the embodiment of the present invention.

An electronic watermark data detecting device of the present invention includes a decoder 202 for decoding MPEG data; an IDCT converter 203 for performing IDCT (inverse cosine transform); an electronic watermark data extractor 204 for extracting electronic watermark data from the frequency data for a k×k pixel size output from the IDCT converter 203 and then storing the extracted data at a predetermined location of the extracted data storage area 205; extracted data storage area 205 for storing the extracted data; and an electronic watermark data detector 206 for calculating a statistical similarity between the extracted data and the electronic watermark data based on the m-th (m=1, 2, . . . , j) data and the extracted data extracted from the electronic watermark data table 208 by means of the electronic watermark data selector 207.

In the electronic watermark data inserting and detecting system of the present invention, the content of the electronic watermark data table with a number on the insertion side must match the content of the electronic watermark data table with the correspondence number on the detection side have correspondence numbers. Moreover, the content of the electronic watermark data location table with a number on the insertion side must match the content of the electronic watermark data location table with the correspondence number on the detection side have correspondence numbers. That is, the content of the m-th (m=1, 2, . . . , j) electronic watermark data table on the insertion side must match the content of the m-th (m=1, 2, . . . , j) electronic watermark data table on the detection side.

Figure 3:
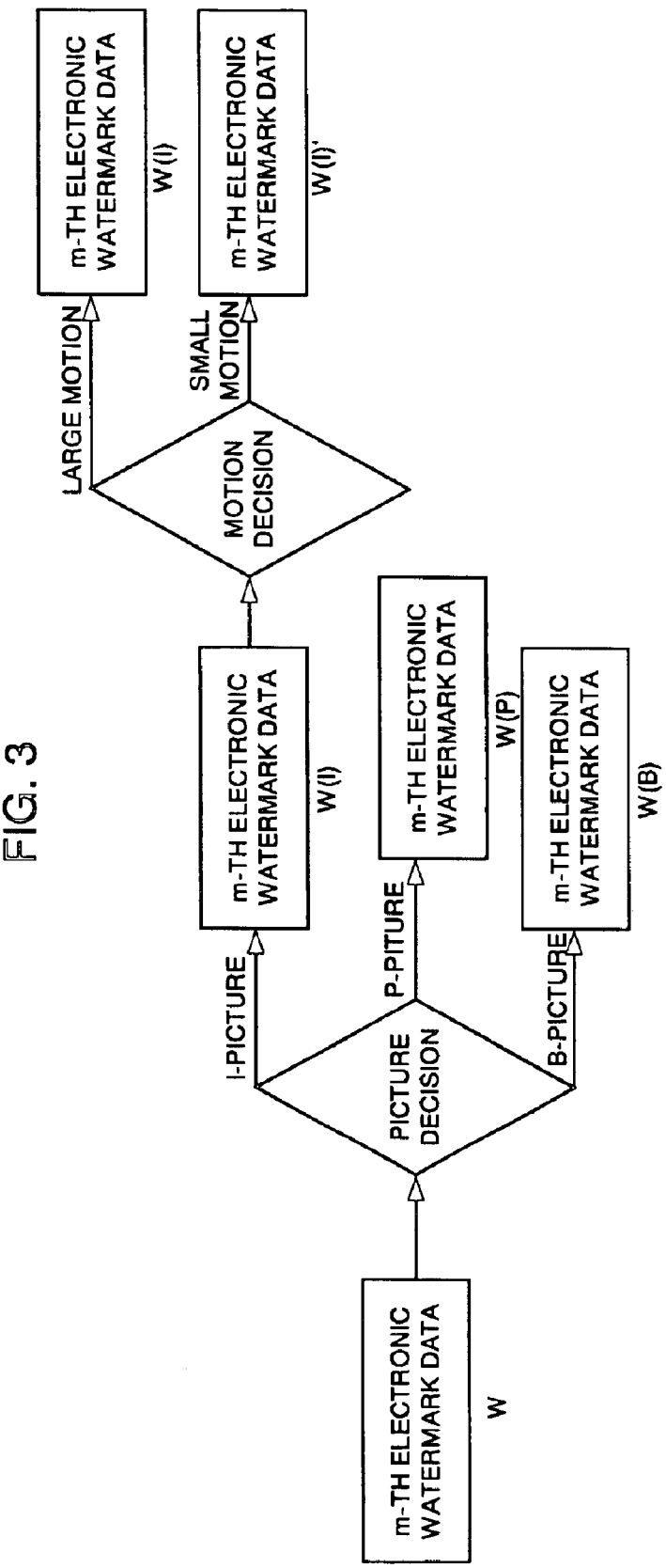
FIG. 3 is a chart illustrating the configuration of an electronic watermark data inserting table and the selection method thereof according to the present invention.

FIG. 3 is a chart illustrating the configuration and the electronic watermark data table 109 and the method of selecting the same, according to the present invention.

The original electronic watermark data W is selected as the strengths (W(I), W(P) and W(B)) of electronic watermark data according to picture types. Thereafter, the strength of motion is decided based on the DCT coefficient generation amount. The strengths (W(I) and W(I')) of electronic watermark data are further selected according to the strength of motion. Thus, the electronic watermark data table 109 shown in FIG. 1 is created by tabulating electronic watermark data strengths into six patterns.

Figure 4:
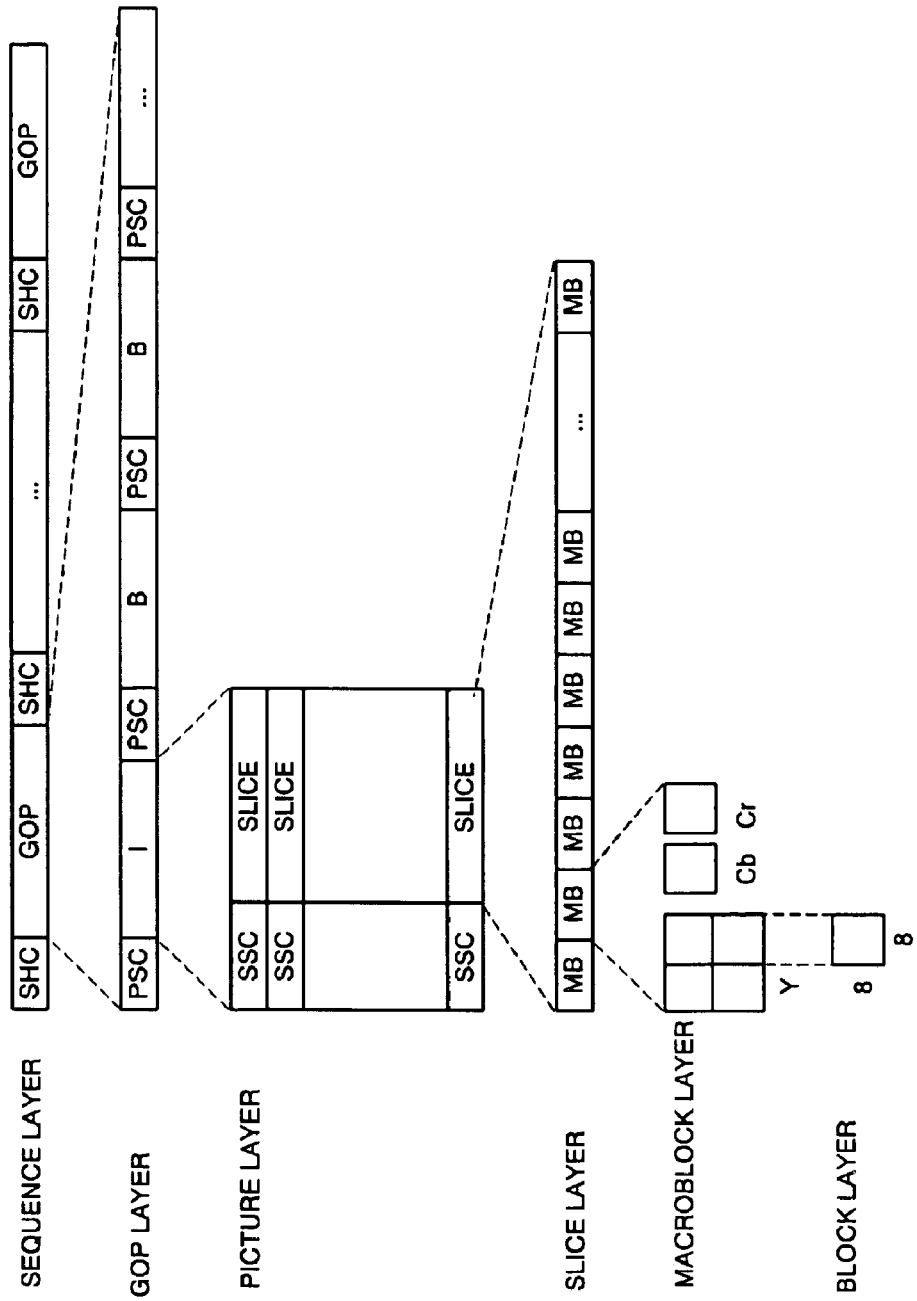
FIG. 4 is a diagram illustrating an image data configuration according to the MPEG standard encoding scheme.
Figure 5:
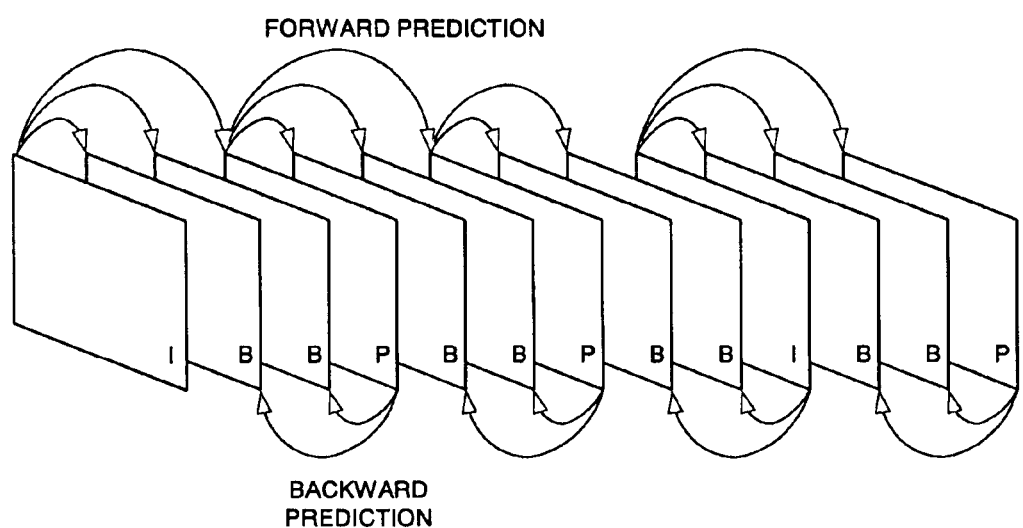
FIG. 5 is a diagram explaining the encoding of each frame or field information.

Nest, the structure of image data will be explained below using FIGS. 4 and 5. The image data according to the MPEG standards will be explained here. The image data in accordance with the MPEG standard encoding scheme has the structure shown in FIG. 4. Information about each frame or field of an image is described on picture layers following the picture start code (PSC).

Each frame or field information is encoded in three-type picture formats including I-picture, P picture and B picture. The P picture and the B picture, as shown in FIG. 5, are encoded as image information a difference value only to other image spaced in time as a reference image.

Each picture is sub-divided into blocks, is subjected to a DCT (discrete cosine transform) in block units, is quantized with a suitable quantization coefficient, and thus is Huffman encoded. Field information of each frame lies in a macroblock layer (MB) following the slice layer following the slice start code (SSC). The filed information is shown by six block layers including four block layers representing luminance information Y and two block layers representing color difference information Cb and color difference information Cr.

The DCT coefficient is scanned in numerical order as shown in FIG. 7 and then is converted into 64 one-dimensional sequences. The location (1) of FIG. 7 represents a direct current (DC) component of a DCT conversion area. As the axis is moved from the location (1) in the right direction, the horizontal DCT conversion area becomes high. As the axis is moved from the location (1) downward, the vertical DCT conversion area becomes high. The scanning is first performed from the location (1) of the upper left corner in the order of 2, 3, . . . , 64. That is, a zigzag scanning is performed slantingly from the low frequency area of the DCT conversion area.

Next, the operation of the electronic watermark data inserting system will be explained by referring to FIG. 1.

The DCT converter 103 extracts block data 102 of a 8×8 pixel size from the original image 101 and subjects it to DCT conversion. Next, the quantizer 104 quantizes the DCT coefficient. The movement decision unit 106 calculates the difference between V(t) DCT coefficients obtained from the DCT converter 103 and V(t−1) DCT coefficients of the front frame previously held. If the difference value exceeds a certain threshold value, the movement decision unit 106 decides that the movement is large. If the difference value less than a certain threshold value, the movement decision unit 106 decides that the movement is small.

The electronic watermark data inserter 105 extracts the electronic watermark data W(j) which matches with the location where the 8×8 block data is extracted, picture type and the magnitude of movement, from the electronic watermark data table 109 and then inserts it into the data after quantization output from the electronic quantizer 104. Provided that the original electronic watermark data is W(e), the electronic watermark data W(j) can be expressed by the formula W(j)=k×W(e), where k is a coefficient having the magnitude of movement and is provided for each picture type.

Thereafter, inverse quantization is performed with the inverse quantizer 110. The IDCT converter 111 performs IDCT conversion of data output from the inverse quantizer 110. Data is stored into the location 113 within the image storage area 112 to which electronic watermark data is inserted. The location 113 is the same as the location at which the DCT decision unit 103 has extracted 8×8 block data.

The above operation is performed to all areas of one screen. Electronic watermark is inserted in units of a 8×8 block into all areas of one screen. When compressed data is created, the Huffman encoder 114 encodes output data of the electronic watermark data inserter 105 and outputs it as the compressed data 115.

Next, the operation of the electronic watermark data detection system will be explained with reference to FIG. 2.

The decoder 202 decodes block data of a 8×8 pixel size output from the compressed data 201. Thereafter, the IDCT conversion 203 performs IDCT conversion. The electronic watermark data extracter 204 captures the number of electronic watermark data to be extracted from the electronic watermark data table 208, based on location information of the 8×8 block data extracted. The electronic watermark data extracter 204 further extracts electronic watermark data from data after IDCT conversion output from the IDCT converter 203 and then stores it into the extracted data storage area 205. The above-mentioned operation is performed to all the 8×8 size blocks for one screen.

After the extracted data for one screen is stored into the extracted data storage area 205, the electronic watermark data detector 206 extracts electronic watermark data from the extracted data storage area 205 and the electronic watermark data table 208. Thus, the electronic watermark data detector 206 calculates the statistical similarity and then outputs it as the detection output 209.

Figure 6:
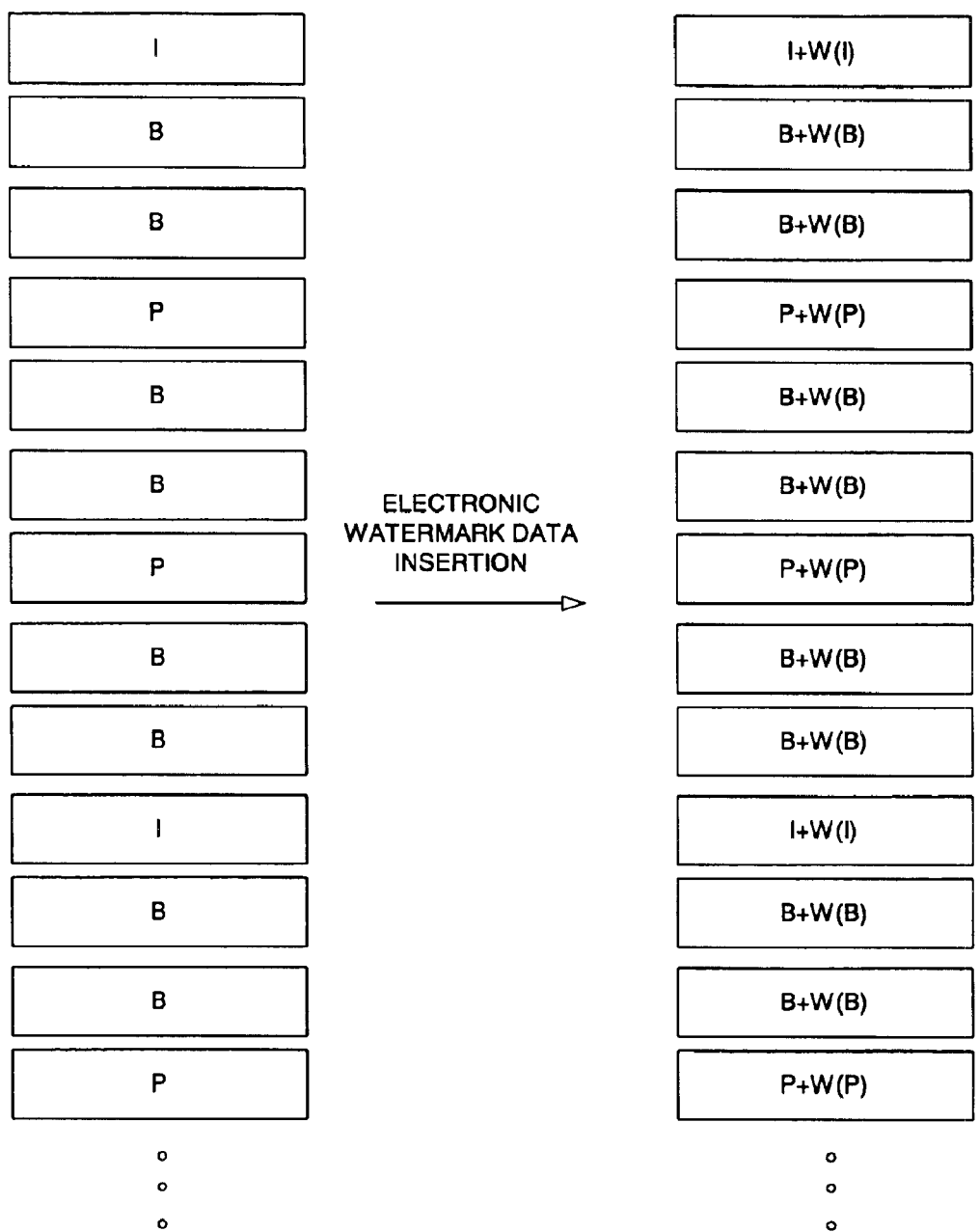
FIG. 6 is a diagram explaining the operation of each picture type.

Next, the operation of each picture type will be explained with reference to FIG. 6. Referring to FIG. 5, when electronic watermark data is buried in the I-picture, the DCT component changes from I to I+W(I). When electronic watermark data is buried in the B-picture, the DCT component changes from B to B+W(B). When electronic watermark data is buried in the P-picture, the DCT component changes from P to P+W(P). I represents the DCT component of I-picture. B represents the DCT component of B picture. P represents the DCT component of P picture. W(I) represents a DCT component buried in I-picture. W(B) represents a DCT component buried in B-picture. W(P) represents a DCT component buried in P-picture.

Figure 8:
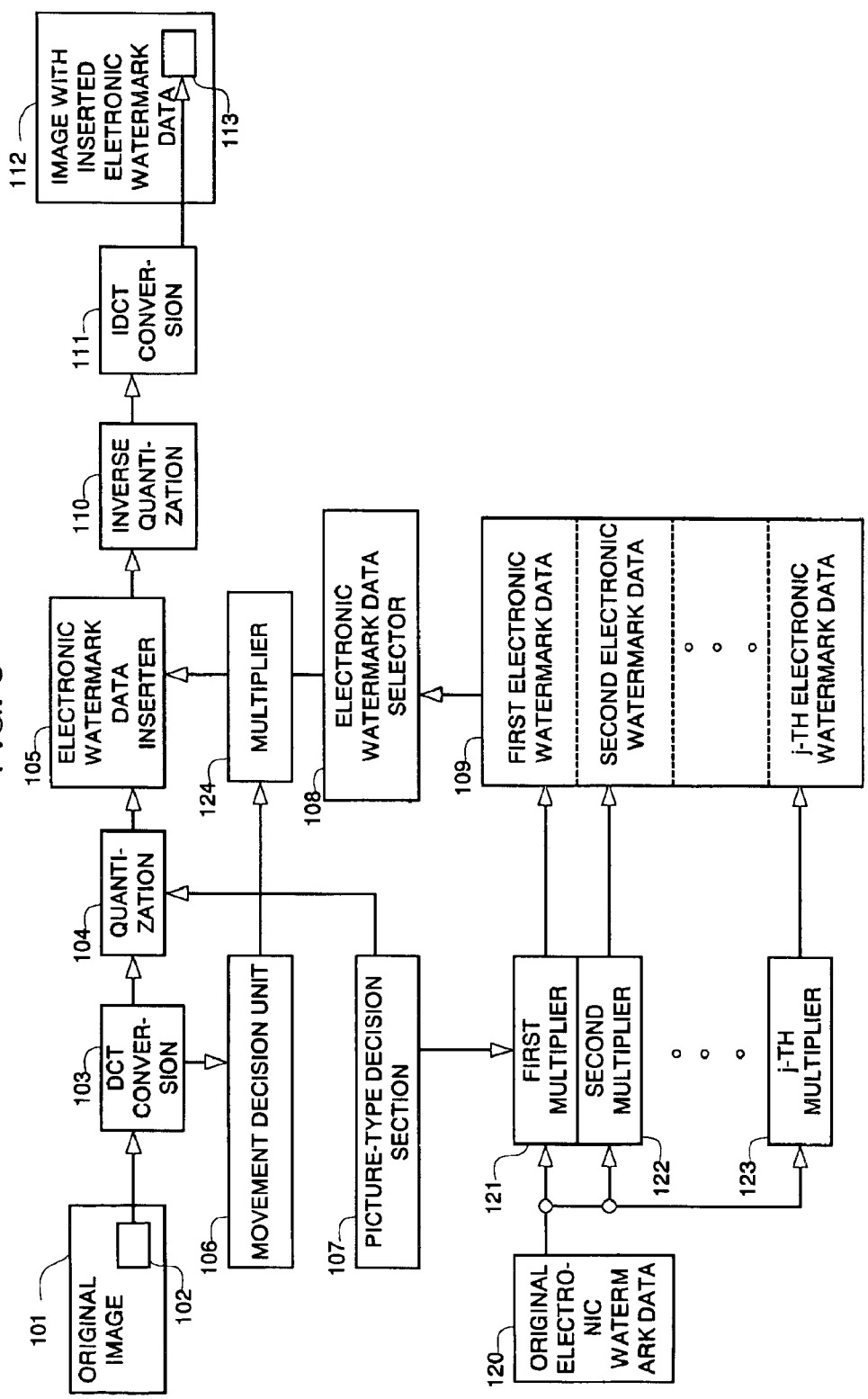
FIG. 8 is a system block diagram illustrating an electronic watermark data inserting system according to another embodiment of the present invention.
Figure 9:
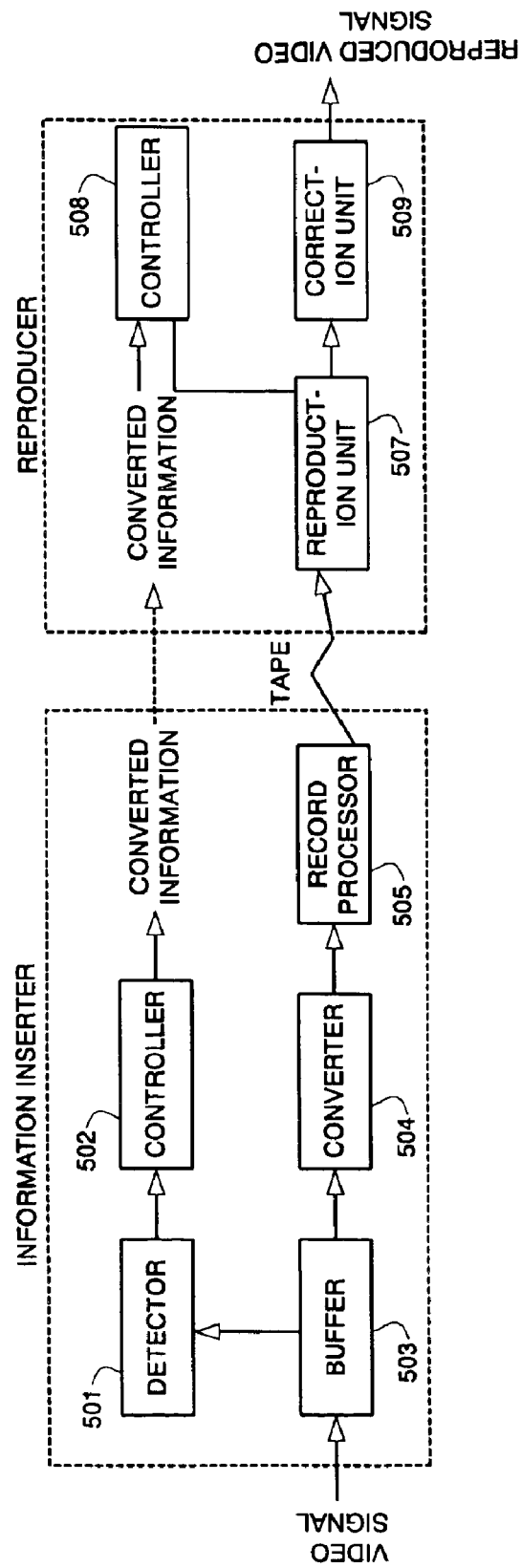
FIG. 9 is a diagram illustrating a prior art example.
Figure 10:
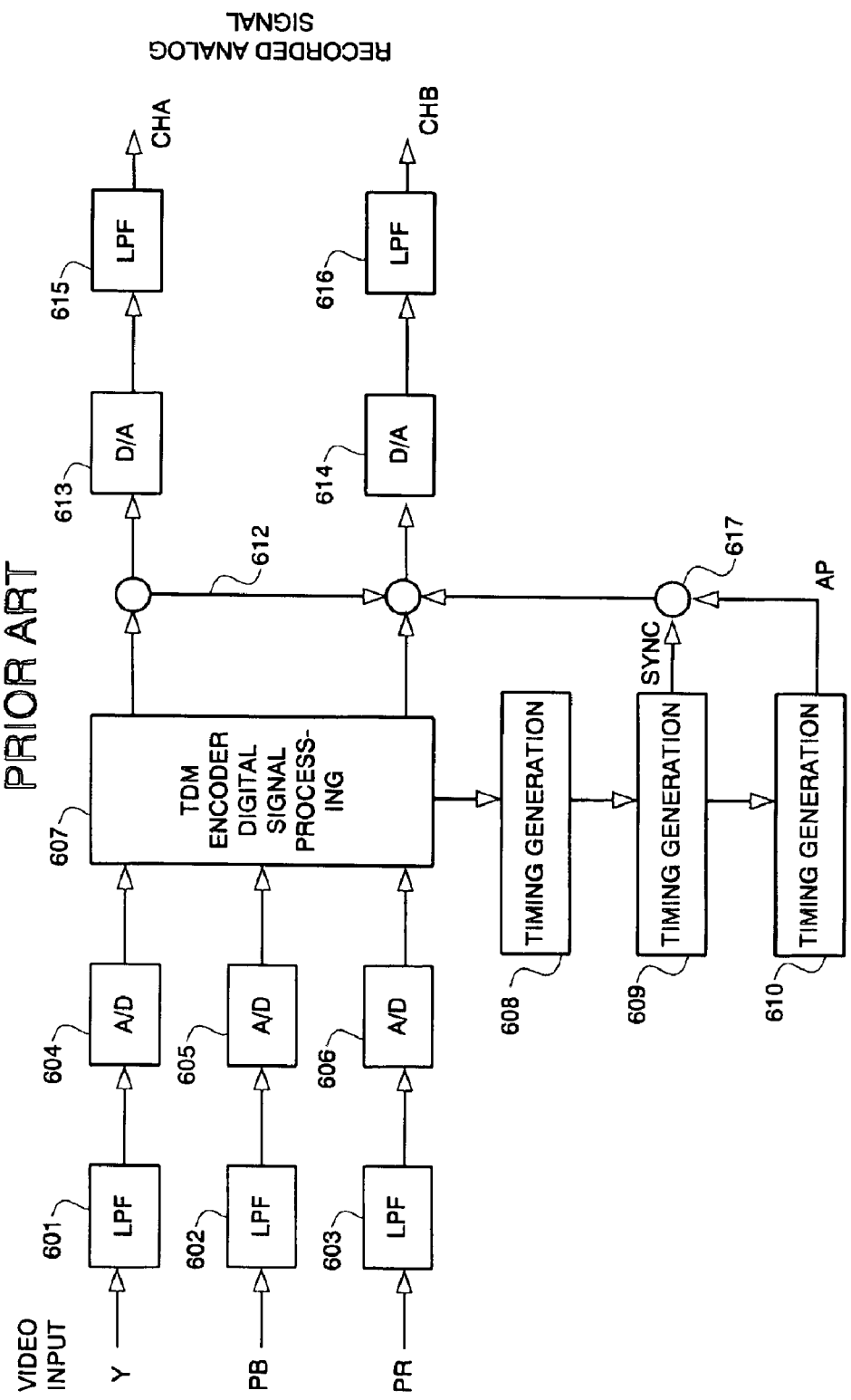
FIG. 10 is a diagram illustrating a prior art example.

FIG. 8 is a system block diagram illustrating the system and device of inserting electronic watermark data according to another embodiment of the present invention.

In this embodiment, the electronic watermark data inserting system includes a DCT converter 103 for extracting a block of k×k pixels from an original image, subjecting the block to a DCT (discrete cosine transform), and then outputting data after the DCT conversion; a quantizer 104 for quantizing DCT coefficients; a movement decision unit 106 for deciding a movement based on a difference between a DCT coefficient generation amount V(t) obtained by the DCT converter and a DCT coefficient generation amount V(t−1) of the front frame preciously held; a picture type decision section 107 for deciding a picture type; original electronic watermark data storage means 120 for storing original electronic watermark data; j multipliers (the first multiplier 121, the second multiplier 122, . . . , the j-th multiplier 123) each for subjecting said original electronic watermark to multiplication according to said picture type; an electronic watermark data table 109 for storing electronic watermark data of j types ranging from the first electronic watermark data to j-th electronic watermark data; an electronic watermark data selector 108 for selecting electronic watermark data of one type of electronic watermark data according to locations of a 8×8 pixel size block; a multiplier 124 for subjecting electronic watermark data to multiplication according to a movement decided by the movement decision unit; an electronic watermark data inserter 105 for inserting electronic watermark data into data after the DCT conversion; an inverse quantizer 110 for inverse-quantizing a k×k size block in which the electronic watermark data is inserted; and an IDCT converter 111 for performing IDCT (discrete cosine transform).

Next, the operation of the electronic watermark data inserting system will be explained below. The DCT converter 103 extracts the block data 102 of a 8×8 pixel size from the original image 101 and then subjects it to DCT conversion. The quantizer 104 quantizes the DCT coefficients. The J multipliers 121 to 123 performs multiplication of the original electronic watermark data according to picture types and then stores j electronic watermark data sets into the electronic watermark data table 109.

In this case, multiplication factors of j multipliers may be decided previously or may be rewritten during operation. When the multiplication factor is 1, the corresponding multiplier may be omitted.

The electronic watermark data selector 108 extracts from the electronic watermark data table 109 electronic watermark data matching the location of each 8×8 pixel size block. The multiplier 124 multiplies the extracted electronic watermark data by electronic watermark data selected according to the magnitude of a movement worked out by the movement decision unit 106.

The multiplication factor of the multiplier 124 may be previously decided or may be arbitrarily rewritten during operation. When the multiplication factor is 1, the multiplier may be omitted. The electronic watermark data inserter 105 inserts the data after quantization output from the quantizer 104 into the above-obtained electronic watermark data.

The IDCT converter 111 IDCT-converts data output from the inverse quantizer 110 and then stores the data to the same location 113 as the location where the DCT converter 103 has extracted 8×8 block data within the image storage area 112 in which the electronic watermark data is inserted. The above operation is carried out over the whole of one screen. Electronic watermark data sets are inserted to all the areas in 8×8 block units.

The encoding system according to the MPEG standards has been explained in the above embodiment. However, other image encoding systems, for example, H.261, employing the DCT can be applied to the present invention.

In the system and device of inserting electronic watermark of the present invention, electronic watermark data with a suitable strength is inserted which is obtained based on a movement (a difference with respect to the front frame) decided from the DCT coefficient generation amount in addition to the picture type. Consequently, the electronic watermark data inserting system can be realized which provides a high detection efficiency without deteriorating the image quality.

What is claimed is:

1. A system for inserting an electronic watermark data comprising:

DCT converter for extracting a block of k×k pixels from an original image, subjecting said block to DCT (discrete cosine transform), and then outputting data after the DCT conversion;

quantizer for quantizing DCT coefficients output from said DCT converter;

movement decision means for deciding the magnitude of a movement based on a generation amount from said DCT converter;

picture-type decision means for deciding a picture type;

an electronic watermark data table for storing first to j-th electronic watermark data, each of said first to j-th electronic watermark data having two values depending on the magnitude of a movement, one value corresponding to low movement and the other corresponding to high movement, when the movement value is compared with a threshold value and said movement is based on a generation amount from said DCT converter, for each picture type;

electronic watermark data selector for selecting said electronic watermark data of one type according to said picture type and said movement; and electronic watermark data inserter means for inserting said selected electronic watermark data into data after said DCT conversion;

whereby the magnitude of a movement is decided by obtaining a difference between a DCT coefficient of a front frame and a DCT coefficient of a rear frame and electronic watermark data with a suitable strength is inserted according to the magnitude of said movement.

2. A system for inserting an electronic watermark data comprising:

DCT converter for extracting a block of k×k pixels from an original image, subjecting said block to DCT (discrete cosine transform), and then outputting data after the DCT conversion;

quantizer means for quantizing DCT coefficients output from said DCT converter means;

movement decision means for deciding the magnitude of a movement of said original image based on a difference of the number between the DCT coefficients output from said DCT conversion step and the DCT coefficients of the previous frame that was pre-retained;

picture-type decision means for deciding a picture type;

original electronic watermark data memory for storing original electronic watermark data;

j first multipliers each for subjecting said original electronic watermark to multiplication data according to said picture type;

an electronic watermark data table for storing electronic watermark data of j types ranging from the first electronic watermark data to the j-th electronic watermark data being outputs from said j multipliers;

electronic watermark data selector for selecting electronic watermark data of one type among said electronic watermark data of j types;

a second multiplier for subjecting said selected electronic watermark data to multiplication according to the magnitude of a movement obtained based on a difference between said DCT coefficients; and electronic watermark data insertion means for inserting electronic watermark data obtained through multiplication by said second multiplier into data after said DCT conversion;

whereby the magnitude of a movement is decided by obtaining a difference between a DCT coefficient of a front frame and a DCT coefficient of a rear frame and electronic watermark data with a suitable strength is inserted according to the magnitude of said movement.

3. A apparatus for inserting an electronic watermark data comprising:

a DCT converter for extracting a block of k×k pixels from an original image, subjecting said block to DCT (discrete cosine transform), and then outputting data after the DCT conversion;

a quantizer for quantizing DCT coefficients output from said DCT converter;

a movement decision unit for deciding the magnitude of a movement based on a generation amount from said DCT converter;

a picture-type decision unit for deciding a picture type;

an electronic watermark data table for storing first to j-th electronic watermark data, each of said first to j-th electronic watermark data having two values depending on the magnitude of a movement, one value corresponding to low movement and the other corresponding to high movement, when the movement value is compared with a threshold value and said movement is based on a generation amount from said DCT converter, for each picture type;

an electronic watermark data selector for selecting said electronic watermark data of one type according to said picture type and said movement; and an electronic watermark data inserter means for inserting said selected electronic watermark data into data after said DCT conversion;

an inverse quantizer for inverse-quantizing a block of k×k pixels in which said electronic watermark data is inserted; and an IDCT converter for performing an IDCT (discrete cosine transform) of a block of k×k pixels in which said electronic watermark data inverse-quantized is inserted.

4. An apparatus for inserting an electronic watermark data comprising:

a DCT converter for extracting a block of k×k pixels from an original image, subjecting said block to DCT (discrete cosine transform), and then outputting data after the DCT conversion;

a quantizer for quantizing DCT coefficients output from said DCT converter;

a movement decision unit for deciding the magnitude of a movement based on a generation amount from said DCT converter;

a picture-type decision unit for deciding a picture type;

an electronic watermark data table for storing first to j-th electronic watermark data, each of said first to j-th electronic watermark data having two values depending on the magnitude of a movement, one value corresponding to low movement and the other corresponding to high movement, when the movement value is compared with a threshold value and said movement is based on a generation amount from said DCT converter, for each picture type;

an electronic watermark data selector for selecting said electronic watermark data of one type according to said picture type and said movement; and an electronic watermark data inserter means for inserting said selected electronic watermark data into data after said DCT conversion; and a Huffman encoder for encoding data after insertion of said electronic watermark data.

5. An apparatus for inserting an electronic watermark data comprising:

a DCT converter for extracting a block of k×k pixels from an original image, subjecting said block to DCT (discrete cosine transform), and then outputting data after the DCT conversion;

a quantizer for quantizing DCT coefficients output from said DCT converter;

a movement decision unit for deciding the magnitude of a movement of said original image based on a difference of the number between the DCT coefficients output from said DCT conversion step and the DCT coefficients of the previous frame that was pre-retained;

a picture-type decision unit for deciding a picture type;

original electronic watermark data storage means for storing original electronic watermark data;

j first multipliers each for subjecting said original electronic watermark to multiplication data according to said picture type;

an electronic watermark data table for storing electronic watermark data of j types ranging from the first electronic watermark data to j-th electronic watermark data being outputs from said j multipliers;

an electronic watermark data selector for selecting electronic watermark data of one type among said electronic watermark data of j types;

a second multiplier for subjecting said selected electronic watermark data to multiplication according to the magnitude of a movement obtained based on a difference between said DCT coefficients; and an electronic watermark data inserter for inserting electronic watermark data obtained through multiplication by said second multiplier into data after said DCT conversion;

an inverse quantizer for inverse-quantizing a block of k×k pixels in which said electronic watermark data is inserted; and an IDCT converter for performing an IDCT (discrete cosine transform).

6. The apparatus for inserting an electronic watermark data defined in claim 5, wherein said first multiplier and said second multiplier are omitted when a multiplication coefficient is 1.

7. A system for inserting an electronic watermark data comprising:

DCT converter for extracting a block of k×k pixels from an original image, subjecting said block to DCT (discrete cosine transform), and then outputting data after the DCT conversion;

quantizer for quantizing DCT coefficients output from said DCT converter;

movement decider which operates to decide the magnitude of a movement based on a generation amount from said DCT converter;

picture-type decider which operates to determine a picture type;

an electronic watermark data table for storing first to j-th electronic watermark data, each of said first to electronic watermark data having two values depending on the magnitude of a movement, one value corresponding to low movement and the other corresponding to high movement, when the movement value is compared with a threshold value and said movement is a based on a generation amount from said DCT converter, for each picture type;

electronic watermark data selector for selecting said electronic watermark data of one type according to said picture type and said movement; and electronic watermark data inserter which operates to insert said selected electronic watermark data into data after said DCT conversion;

whereby the magnitude of a movement is decided by obtaining a difference between a DCT coefficient of front frame and a DCT coefficient of a rear frame and electronic watermark data with a suitable strength is inserted according to the magnitude of said movement.

* * * * *